United States Patent
Vogtmeier et al.

(10) Patent No.: US 7,405,408 B2
(45) Date of Patent: Jul. 29, 2008

(54) SHIELDING FOR AN X-RAY DETECTOR

(75) Inventors: Gereon Vogtmeier, Aachen (DE); Roger Steadman, Aachen (DE); Klaus Jurgen Engel, Aachen (DE); Herfried Wieczorek, Aachen (DE); Wolfgang Eckenbach, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 196 days.

(21) Appl. No.: 10/596,152

(22) PCT Filed: Dec. 2, 2004

(86) PCT No.: PCT/IB2004/052640

§ 371 (c)(1),
(2), (4) Date: Jun. 1, 2006

(87) PCT Pub. No.: WO2005/057235

PCT Pub. Date: Jun. 23, 2005

(65) Prior Publication Data
US 2007/0057192 A1    Mar. 15, 2007

(30) Foreign Application Priority Data
Dec. 9, 2003    (EP)    ................... 03104598

(51) Int. Cl.
G01T 1/20    (2006.01)
(52) U.S. Cl. ............................... 250/370.11
(58) Field of Classification Search ..........................
250/370.01–370.15, 505.1, 515.1, 367, 368,
250/366, 336.1, 390.1, 390, 482.1, 486.1,
250/338.4
See application file for complete search history.

(56) References Cited

U.S. PATENT DOCUMENTS

| 4,492,869 | A | 1/1985 | Suzuki et al. |
| 4,845,363 | A | 7/1989 | Akai |
| 5,929,449 | A | 7/1999 | Huang |
| 6,292,528 | B1 | 9/2001 | Wieczorek et al. |
| 6,324,244 | B1 | 11/2001 | Lauter et al. |
| 6,495,845 | B1 | 12/2002 | Tsunota et al. |
| 6,982,423 | B2 | 1/2006 | Elgali |
| 2002/0011572 | A1 | 1/2002 | Kajiwara et al. |
| 2003/0116715 | A1* | 6/2003 | Homme et al. ......... 250/370.11 |
| 2003/0234363 | A1* | 12/2003 | Sekine et al. ......... 250/370.11 |

FOREIGN PATENT DOCUMENTS

WO    WO 03/044563 A1    5/2003

* cited by examiner

Primary Examiner—David P. Porta
Assistant Examiner—Kiho Kim

(57) ABSTRACT

The invention relates to an X-ray detector with detector elements (1) arranged in a layer. The detector elements (1) contain a scintillator element (2) for the conversion of X-rays (X) into photons (v), a photodiode (5) for detection of the photons (v), and a processing circuit (4) for the processing of electric signals generated by the photodiode (5). In order to protect the electronics (4) from X-rays a shielding (3) of variable effective thickness (d1, d2) is disposed in front of the electronics (4). This shielding (3) can in particular be L-shaped. By reduction of the effective thickness of the shielding (3) to a necessary minimum the volume of the scintillator unit (2) can be maximized.

20 Claims, 3 Drawing Sheets

SHIELDING FOR AN X-RAY DETECTOR

The invention relates to an X-ray detector with detector elements arranged in a layer, wherein every detector element comprises a sensor unit and a shielded processing circuit coupled thereto.

An X-ray detector of the kind mentioned above may for example be employed in a CT-device. The individual detector elements of such an X-ray detector each generate the image signal of one picture element (pixel). Due to the arrangement of processing circuits in every pixel it is necessary to protect the electronics from interference and damage by incident X-rays. This protection may be achieved by a grid-shaped shielding made of lead or another suitable material disposed in front of the processing circuits.

Furthermore, an X-ray detector is known from the WO 03/044563 A1 where electronic circuits arranged next to an array of photo sensors are shielded by coverings of lead and by a collimator arranged above the sensor array.

It was an object of the present invention to provide an improved X-ray detector of the kind mentioned above with integrated electronics in the pixel which shows a higher sensitivity.

This task is solved based on a new approach to shielding issues by an X-ray detector with the features of claim 1 or 12. Preferred embodiments are subject to the dependent claims.

The X-ray detector in accordance with the invention comprises detector elements that are distributed in a layer or substrate. Typically the detector elements are arranged in a regular, preferably rectangular raster. Every detector element corresponds to one picture element (pixel) of images generated by the X-ray detector. The detector elements each comprise a sensor unit for the conversion of radiation into an electric signal. Moreover they comprise an electronic processing circuit coupled to the sensor unit for the postprocessing of the electric signals generated by the sensor unit. A shielding of variable shielding effectiveness (or shield factor) is arranged in front of the processing circuit or at least in front of regions of the processing circuit that have to be protected against X-radiation. In this context, the term "in front of" refers to the direction of incidence of X-rays. This means that the shielding is disposed on that side of the processing circuits which faces the X-radiation, e.g. on top of the processing units if X-radiation comes from above. Thus the X-radiation is absorbed in the shielding before it reaches vulnerable parts of the processing circuit. In contrast to known detectors, the shielding effectiveness is not the same in all places in front of the processing circuit, but variable. Thus it may be fitted to the locally needs of different regions of the processing circuit.

A varying shielding effectiveness may be achieved in different ways. The shielding may for example be composed (continuously or discretely) of different materials with different absorption coefficients for X-rays. The choice of a certain material in a certain place of the shielding may in this case be based on its shielding effectiveness and other aspects like weight, processibility, price etc. Preferably a varying shielding effectiveness will however be achieved by a varying effective thickness of the shielding (which may of course be combined with in inhomogeneous shielding material). The "effective thickness" is defined and measured in this case as the geometrical thickness of the shielding in the direction of X-ray incidence. In contrast to known detectors, the effective thickness of the shielding is not the same in all places in front of the processing circuit, but variable. Thus it may be fitted to the locally needed shielding effectiveness of different regions of the processing circuit. In particular a minimal effective thickness of the shielding in front of each region of the processing circuit can be chosen such that the provided shielding is just sufficient. In this case the shielding occupies a minimal volume only, and absorption of X-rays that is not necessary for the protection of the electronics is avoided. This in turn maximises the yield of X-ray quanta that are detected by the sensor units.

In accordance with a preferred embodiment of the X-ray detector a scintillator unit is disposed in front of the sensor unit in each detector element. As above, the term "in front of" is defined here with respect to the incidence of X-rays. The scintillator unit converts X-rays into photons of visible light that can be detected by photosensitive sensor units.

Preferably the scintillator units mentioned above and the shieldings of the processing circuits are arranged together in a common layer without gaps between them. As the shielding can be reduced to a minimal volume due to its variable effective thickness, the volume of the scintillation material in turn can be maximised. Thus the yield of detected X-ray quanta is maximized.

The form or shape of the shielding can in principle be arbitrary. Preferably the shielding is formed as a section (profile), i.e. a spatial form whose cross section is constant in one spatial direction. Sections can be produced comparatively simple and economical, for example by means of an extrusion process. Moreover it is possible to arrange sections continuously along the rows and/or columns of a matrix-shaped X-ray detector. In this case one section can provide the shielding for a great number of detector elements.

In accordance with a preferred embodiment the section consists of a spatially shaped stripe of some shielding material. Such a section can be produced especially simply by bending a stripe that is initially flat into a desired spatial shape.

Moreover, the section can be L-shaped, i.e. have an L-shaped cross section. The L-shape can particularly be achieved by bending a stripe of some shielding material.

Furthermore the section can be trapezoidal or triangular, i.e. have a trapezoidal/triangular cross section. A triangular cross section can be regarded as a special case of a trapezoidal section in this case (i.e. trapezoid with one side of length zero). Due to the sloped sides of a trapezoid the effective thickness of the shielding changes continuously, thus implementing a continuously varying shielding effectiveness.

All materials that show a sufficiently high absorption coefficient for X-radiation of a given energy and that can be processed comparatively well can be used as a material for the shielding. Particularly suited materials comprise lead (Pb), tungsten (W) molybdenum (Mo), tantalum (Ta), titanium (Ti) and/or other substances with high atomic weight (Z number). Moreover, salts like barium sulphate ($BaSO_4$), barium carbonate ($BaCO_3$), barium oxide (BaO), lead carbonate ($PbCO_3$), lead chloride ($PbCl_2$), lead sulphate ($PbSO_4$), titanium oxide ($TiO_2$) and/or zinc oxide (ZnO) can be used in a shielding.

The shielding may consist exclusively of one of the materials mentioned above or a composition (e.g. an alloy) of several of these materials. Alternatively at least one of the materials may be embedded in a carrier like a plastic or an epoxy-resin. In this case, the shielding effectiveness will be determined by the volume ratio between said material and the carrier.

The sensor unit of the detector elements can especially contain a photodiode with which photons coming from a conversion material can be detected. Such a photodiode can particularly be implemented as an integrated CMOS-circuit (cf. U.S. Pat. No. 6,292,528 B1, U.S. Pat. No. 6,324,244 B1).

Furthermore, the sensor units and the processing circuits may be arranged in a common substrate or layer, i.e. a "chip".

Moreover, the invention relates to an X-ray detector with detector elements arranged in a layer or substrate, the X-ray detector comprising a layer of scintillator units disposed in front of a layer of sensor units. In this context the term "in front of" is again defined with respect to the incidence of X-rays. The scintillator units of the detector are separated from each other by a spacer or shielding that has a high shielding effectiveness with respect to X-rays and a high reflectivity with respect to photons produced in the scintillator units. The shielding effectiveness may particularly be achieved by a shielding material with a high absorption coefficient for X-rays, e.g. like the absorption coefficient of Pb or W. Said reflectivity for photons may particularly be higher than 70%, preferably higher than 90%. The shielding may be a composite comprising a kernel material with high absorption coefficient for X-rays, e.g. barium sulphate ($BaSO_4$), and a surface coating with a high reflectivity for photons, e.g. polyvinylidene fluoride (PVDF).

The proposed X-ray detector has the advantage to protect sensitive elements against potentially harmful X-rays and to prevent cross talk between different sensor units while maximising light output of the scintillator elements as light is reflected back into the adjacent scintillator unit. The detector may preferably comprise all or some of the features of an X-ray detector of the kind described above, i.e. have a shielding of variable effectiveness for pixel electronics etc.

In the following the invention is described by way of example with the help of the accompanying drawings in which:

FIG. 1 a perspective view of a first embodiment of an X-ray detector with L-shaped shieldings;

Figure 1:
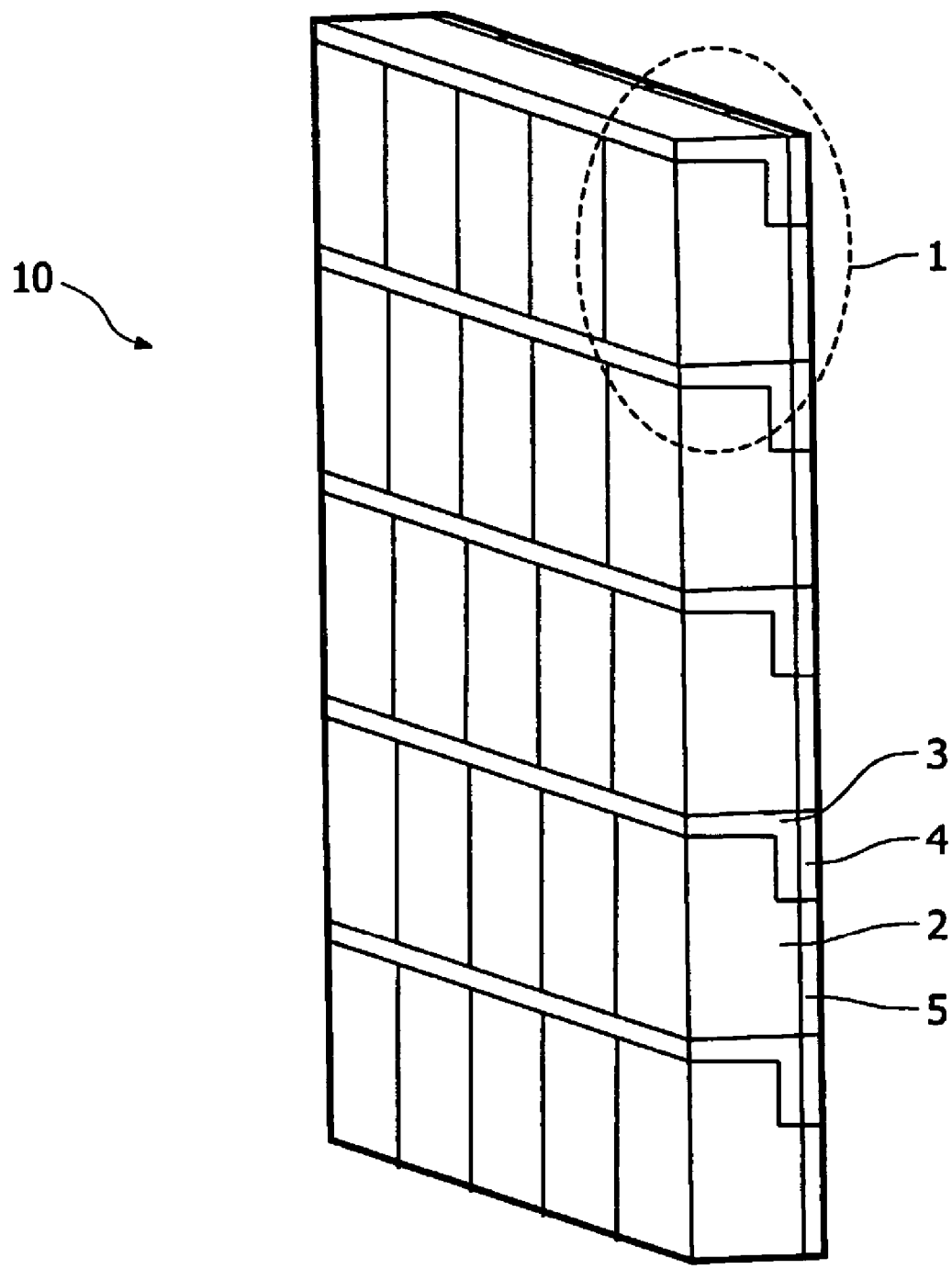

In FIG. 1 a part of an X-ray detector 10 is schematically represented in a perspective view. The X-ray detector 10 consists of a great number (typically several thousand) of detector elements 1 arranged in rows and columns, of which only 25 are depicted in the drawing. Every detector element 1 corresponds to a picture element (pixel) of images produced with the detector 10.

Figure 2:
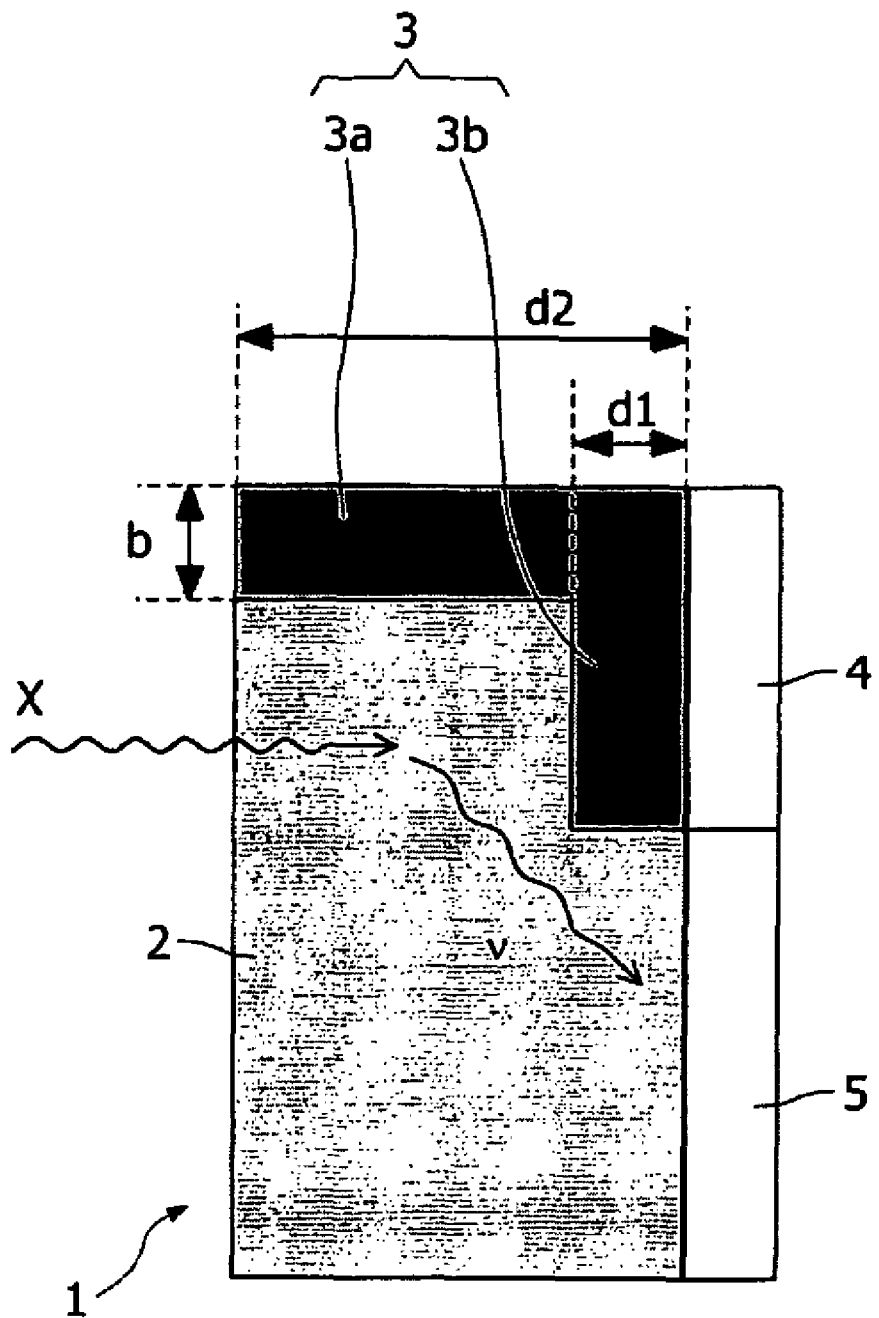
FIG. 2 is a side view of one detector element of the detector of FIG. 1.

As FIG. 2 shows more clearly, each of the detector elements 1 is built up in two layers. A (with respect to the direction of arrival of X-rays X) "backward" layer contains a photodiode 5 and a corresponding electronic processing circuit 4. The photodiode 5 and the circuit 4 can particularly be implemented in CMOS technology on the same substrate. The layer left or (with respect to the direction of arrival of the X-rays X) "in front of" the photodiode 5 and the processing circuit 4 comprises a scintillation element or crystal 2 as well as a shielding 3. The scintillator element 2 consists of a suitable scintillation material as for example $CdWO_4$, GOS ($Gd_2O_2S$). It is used for converting incident X-ray quanta X into photons ν of visible light. Those photons ν which reach the photodiode 5 generate an electric signal there. This electric signal is processed by the circuit 4 and read out in some manner that is known to the skilled artisan and must not be explained in more detail here.

The shielding 3 is used for protecting the processing circuit 4 located behind it against harmful and/or disturbing X-rays. For this purpose the shielding 3 is produced of a material with high absorption coefficient for X-radiation. A further function of the shielding 3 is to absorb and/or preferably to reflect photons ν produced in the scintillator element 2. In this way it is prevented that such photons ν reach the photodiodes of neighbouring detector elements, i.e. produce cross talk which would lead to an erroneous spatial assignment of the detected radiation and thus to a degraded image quality. A reflection of the photons back into the scintillation element 2 prevents the photon from being lost for detection and thus maximises the light yield. Therefore, the surface reflectivity of the shielding 3 for visible light should be as high as possible.

The best shielding efficiency is achieved with heavy metals like lead, tungsten or molybdenum which are therefore particularly suited for the production of thin shielding foils. Moreover, compositions comprising a pulverized absorption material embedded in a carrier like an epoxy resin may be used as shielding materials. In this case the absorption material may be a metal or a salt of a metal, the salts generally having the higher reflectivity with respect to photons. Preferably salts with a high density are used, for example: salts of barium like $BaSO_4$ (4.48 g/cm$^3$, high reflectivity), $BaCO_3$ (4.43 g/cm$^3$), BaO (5.7 g/cm$^3$); salts of lead like $PbCO_3$ (6.56 g/cm$^3$), $PbCl_2$ (5.9 g/cm$^3$), $PbSO_4$ (6.2 g/cm$^3$); $TiO_2$ (4.23 g/cm$^3$) and/or ZnO (5.6 g/cm$^3$). The shielding efficiency of a composition is primarily determined by the relative volume of the absorption material; for a high shielding efficiency, as little carrier as possible should be used.

When choosing a certain shielding material, the energy of the X-rays that are to be absorbed should be taken into account, too. This is because different applications are characterised by different X-ray energies, typically ranging from about 20 keV in mammography to about 512 keV in positron emission tomography (PET), and because the absorption properties of a material depends on radiation energy. The following two tables list the remaining ratio of intensities $I/I_0$ (in photon numbers) of 25 different absorption and carrier materials for a thickness of $L_0=0.01$ cm of the material. This ratio depends exponentially on the thickness L and a function μ of the radiation energy E according to the following formula: $I/I_0 = \exp(-L \cdot \mu(E))$.

| Energy [keV] | Pb | Mo | Ta | W | Ti |
| --- | --- | --- | --- | --- | --- |
| 10 | 8.80733e−006 | 0.00105918 | 3.51564e−014 | 1.04286e−016 | 0.0203147 |
| 20 | 0.000165166 | 0.000712503 | 8.63839e−005 | 1.34059e−005 | 0.534991 |
| 30 | 0.0420859 | 0.0716168 | 0.0351068 | 0.0179467 | 0.814906 |
| 40 | 0.217721 | 0.28894 | 0.201375 | 0.145398 | 0.910887 |
| 50 | 0.420252 | 0.505349 | 0.404598 | 0.336544 | 0.94931 |
| 60 | 0.579369 | 0.658066 | 0.566167 | 0.504053 | 0.967289 |
| 70 | 0.690047 | 0.757304 | 0.177913 | 0.128645 | 0.976708 |
| 80 | 0.766647 | 0.823334 | 0.293375 | 0.232568 | 0.9823 |
| 90 | 0.448876 | 0.86633 | 0.400679 | 0.33645 | 0.985721 |
| 100 | 0.540656 | 0.896362 | 0.496976 | 0.434433 | 0.988006 |

-continued

| Energy [keV] | Pb | Mo | Ta | W | Ti |
|---|---|---|---|---|---|
| 120 | 0.673645 | 0.93165 | 0.640205 | 0.587107 | 0.990616 |
| 150 | 0.799025 | 0.95849 | 0.777602 | 0.740315 | 0.992644 |
| 300 | 0.955581 | 0.986055 | 0.949203 | 0.939841 | 0.995317 |
| 500 | 0.981927 | 0.991016 | 0.977775 | 0.97387 | 0.996315 |
| 1000 | 0.991989 | 0.994058 | 0.989124 | 0.987345 | 0.997348 |

| Energy [keV] | Al | Fe | Polyethylene | Acrylic plastic | Teflon ® |
|---|---|---|---|---|---|
| 10 | 0.581454 | 2.68923e−005 | 0.984978 | 0.968795 | 0.893457 |
| 20 | 0.921802 | 0.169747 | 0.996262 | 0.993674 | 0.981419 |
| 30 | 0.972331 | 0.555258 | 0.99755 | 0.996486 | 0.991717 |
| 40 | 0.98555 | 0.765368 | 0.997912 | 0.997236 | 0.994383 |
| 50 | 0.990421 | 0.863812 | 0.998077 | 0.997545 | 0.995409 |
| 60 | 0.992697 | 0.912931 | 0.998178 | 0.99772 | 0.995919 |
| 70 | 0.993895 | 0.939513 | 0.998253 | 0.997836 | 0.996221 |
| 80 | 0.994625 | 0.955436 | 0.998312 | 0.997922 | 0.99643 |
| 90 | 0.995097 | 0.965147 | 0.99836 | 0.99799 | 0.996587 |
| 100 | 0.995434 | 0.97166 | 0.998404 | 0.998048 | 0.996713 |
| 120 | 0.995875 | 0.979116 | 0.99848 | 0.998146 | 0.99691 |
| 150 | 0.99629 | 0.984774 | 0.998575 | 0.998265 | 0.997132 |
| 300 | 0.997196 | 0.9914 | 0.998872 | 0.998632 | 0.997737 |
| 500 | 0.997726 | 0.993406 | 0.999076 | 0.99888 | 0.998158 |
| 1000 | 0.998343 | 0.99529 | 0.999325 | 0.999182 | 0.998655 |

As not all regions of the processing circuit 4 require the same degree of protection from X-radiation, it is proposed to shape the shielding 3 with a varying effective thickness. Effective thickness (or shielding effectiveness) is defined and measured in this case in the direction of arrival of the X-rays X or, in other words, orthogonal to the surface of the detector 10 (horizontal direction in the figures). In the embodiment represented in FIGS. 1 and 2, the shielding 3 is for example formed as an L-shaped section or profile of thickness b. The branch 3b of the L contacting the processing circuit 4 has in this case an effective thickness $d1=b$. The thickness b of the section is chosen high enough to prevent cross talk between neighbouring detector elements, while d1 (in this case the same as b) is the minimum size for efficient X-ray shielding of less sensitive electronics. The branch 3a of the L projecting transversally away from the processing circuit 4 on the other hand has a much greater effective thickness d2 in order to protect the regions of the processing circuit 4 located behind it with a much higher shielding effectiveness. Components of the processing circuit 4 that need such a high protection from X-radiation are for example sensitive analogue electronics, while components that require less protection and can be placed under the thinner branch 3b of the shielding 3 comprise e.g. "guarded capacitors" and the like. The dimensions b, d1, d2 of the shielding 3 have to be chosen as a best compromise between requirements regarding cross talk, X-ray shielding, reflection, and light output (scintillator volume).

The advantage of a shielding 3 of variable effective thickness is that its volume can be limited to the necessary minimum needed for a sufficient protection of the processing circuit 4. The volume saved (with respect to a simple cuboid-shaped shielding) in this way can then be filled by scintillation material of the scintillation element 2. Thus the X-ray quantum X shown in FIG. 2 would for example be absorbed by a cuboid-shaped shielding of constant thickness. With the L-shaped shielding 3 of the present embodiment, however, this quantum X is converted into a photon ν in the scintillation material 2, the photon ν being able to reach the photodiode 5 where it is detected. Therefore, the detector quantum efficiency (DQE) of the detector 10 is increased.

The production of an X-ray detector 10 according to FIGS. 1 and 2 is comparatively simple since the shielding 3 can be produced by bending a stripe of lead. Moreover, a recess must be provided at the bottom of the scintillator element 2 in order provide a space for the branch 3b of the shielding 3. This recess can e.g. be made by milling of an initially cuboid-shaped scintillation crystal. Alternatively, two cuboid-shaped scintillation crystals of different heights (d2 and d2-d1) could be glued together.

Figure 3:
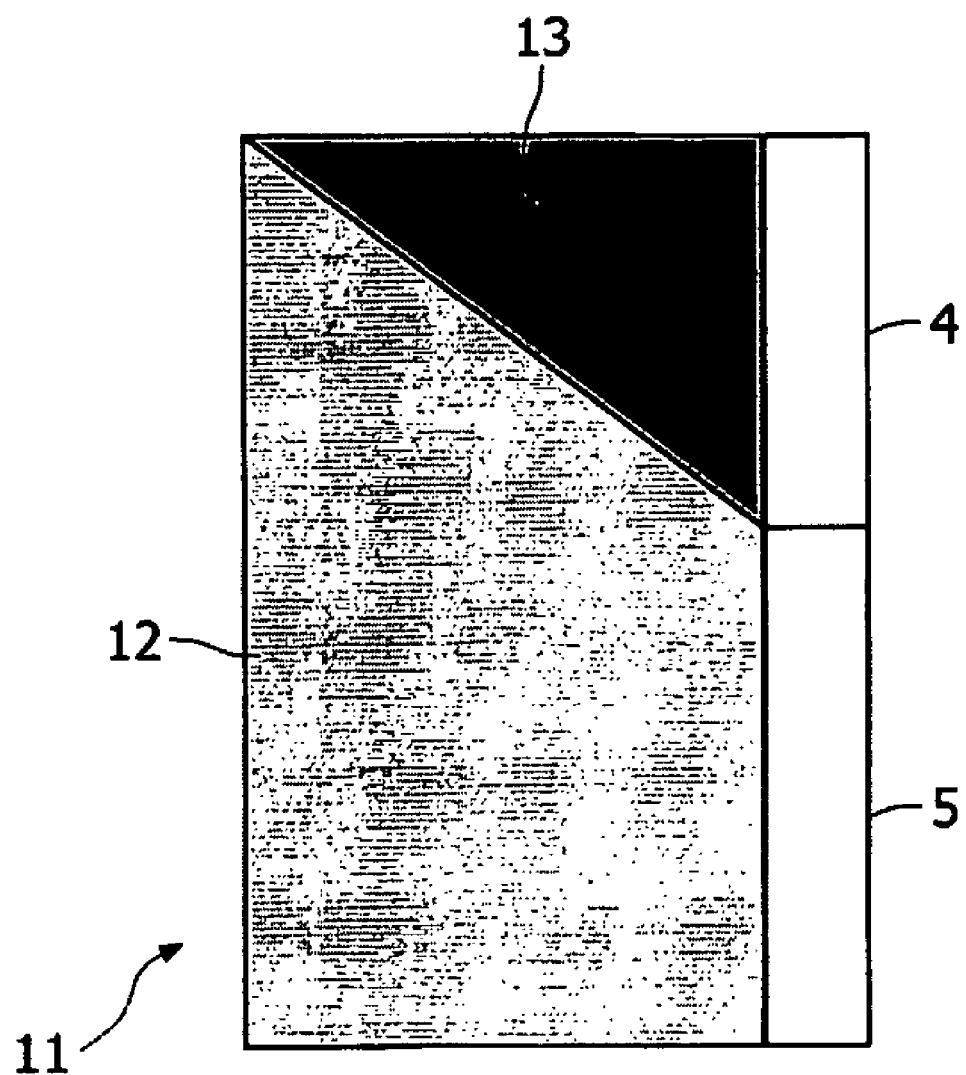
FIG. 3 is a side view of an alternative detector element for an X-ray detector.

An alternative embodiment of the invention is shown in FIG. 3 which depicts a similar view of a single detector element 11 as FIG. 2. Same components as in FIG. 2 are provided with same reference signs and need not be explained again. The difference with respect to the embodiment of FIGS. 1 and 2 is that the shielding 13 of the detector element 11 has the form of a wedge, i.e. a prism with triangular cross section. The thickness of the shielding 13 in front of the processing circuit 4 increases linearly from a minimum at the lower edge in FIG. 3 to a maximum at the upper edge in FIG. 3. The scintillator element 12 is complementarily shaped such that it joins in a gapless way with the shielding 13. This embodiment provides an increased volume for the conversion of X-ray quanta, too, while at the same time a sufficient protection of the electronics 4 is guaranteed.

The shapes of shieldings with varying effective thickness shown in the figures are of course only examples of possible embodiments. The skilled artisan will be able to modify them and find other shapes of varying effective thickness that provide a larger volume for the scintillator and at the same time a sufficient protection of the electronics. Moreover, it is possible to (re-)design circuits in a detector element in such a way that their components lie under those parts of a shielding of given shape that provide just enough protection against radiation.

The invention claimed is:

1. An X-ray detector with detector elements arranged in a layer,
    wherein every detector element comprises a sensor unit and a processing circuit coupled thereto,
    and wherein a shielding of variable shielding effectiveness is disposed in front of the processing circuit.

2. The X-ray-detector according to claim 1, wherein the shielding has a variable effective thickness.

3. The X-ray detector according to claim 2, wherein the shielding is formed as a section.

4. The X-ray detector according to claim 3, wherein the section comprises a spatially shaped strip.

5. The X-ray detector according to claim 3, wherein the section is L-shaped.

6. The X-ray detector according to claim 3, wherein the section is triangular.

7. The X-ray detector according to claim 1, wherein a scintillator unit is disposed in front of each sensor unit.

8. The X-ray detector according to claim 7, wherein the scintillator unit and the shielding are arranged in a gapless way in a common layer.

9. The X-ray detector according to claim 1, wherein material of the shielding contains at least one of the following substances: Pb, W, Mo, Ta, Ti, $BaSO_4$, $BaCO_3$, BaO, $PbCO_3$, $PbCl_2$, $PbSO_4$, $TiO_2$ and/or ZnO.

10. The X-ray detector according to claim 9, wherein said material is embedded in an epoxy-resin earner.

11. The X-ray detector according to claim 1, wherein the sensor units and the processing circuits are arranged in a common layer.

12. The X-ray detector according to claim 1, wherein the shielding is disposed only in front of regions of the processing circuit that are to be protected against X-radiation and between a direction of incidence of X-rays and the regions.

13. The X-ray detector according to claim 1, wherein the shielding is continuously composed of different materials with different absorption coefficients for X-rays along a direction orthogonal to a direction of incidence of X-rays.

14. The X-ray detector according to claim 1, wherein the shielding is discretely composed of different materials with different absorption coefficients for X-rays along a direction orthogonal to a direction of incidence of X-rays.

15. The X-ray detector according to claim 1, wherein the shielding is L-shaped, and the entirety of the L-shaped shielding resides directly in front of the processing circuit between the processing circuit and incident x-rays.

16. The X-ray detector according to claim 1, wherein material of the shielding contains at least one of the following substances: W, Mo, Ta, Ti, $BaSO_4$, $BaCO_3$, BaO, $TiO_2$ or ZnO.

17. An X-ray detector with detector elements arranged in a layer comprising a layer of scintillator units disposed in front of a layer of sensor units, the scintillator units being separated from each other by a shielding that has a high shielding effectiveness with respect to X-rays and a high reflectivity with respect to photons produced in the scintillator units, and every detector element includes a sensor unit and a processing circuit coupled thereto, wherein a shielding, with continuously or discretely varying absorption coefficients for X-rays, is disposed in front of the processing circuit so that it only shields radiation sensitive regions of the processing circuit.

18. A method, comprising: shielding a radiation sensitive region of a processing circuit of a radiation sensitive detector from radiation incident on a radiation sensitive surface of the detector; wherein the x-ray absorption coefficient of the shielding varies in a direction orthogonal to a direction of incident x-rays along the radiation sensitive region, thereby the shielding is not the same in all places in front of the processing circuit.

19. The method of claim 18, wherein the shielding is triangular in shape and varies in thickness in the direction orthogonal to the direction of incident x-rays.

20. The method of claim 18, wherein the shielding is composed of two or more materials with different absorption coefficients for X-rays in the direction orthogonal to the direction of incident x-rays.

\* \* \* \* \*